United States Patent
Yin et al.

(10) Patent No.: US 10,218,698 B2
(45) Date of Patent: Feb. 26, 2019

(54) USING A MOBILE DEVICE NUMBER (MDN) SERVICE IN MULTIFACTOR AUTHENTICATION

(71) Applicant: Verizon Patent and Licensing Inc., Arlington, VA (US)

(72) Inventors: Fenglin Yin, Lexington, MA (US); Jianxiu Hao, Acton, MA (US); Zhong Chen, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 89 days.

(21) Appl. No.: 14/926,234

(22) Filed: Oct. 29, 2015

(65) Prior Publication Data

US 2017/0126675 A1     May 4, 2017

(51) Int. Cl.
*H04L 29/06*     (2006.01)
*H04L 9/06*     (2006.01)

(52) U.S. Cl.
CPC ........ *H04L 63/0876* (2013.01); *H04L 9/0643* (2013.01); *H04L 63/083* (2013.01); *H04L 63/126* (2013.01); *H04L 2463/082* (2013.01)

(58) Field of Classification Search
CPC ............... H04L 63/0876; H04L 63/083; H04L 63/0807; H04L 63/126; H04L 63/0853
See application file for complete search history.

(56) References Cited

U.S. PATENT DOCUMENTS

| | | | | |
|---|---|---|---|---|
| 5,825,890 A | * | 10/1998 | Elgamal | H04L 29/06 713/151 |
| 6,952,781 B1 | * | 10/2005 | Chang | G06F 21/34 713/160 |
| 7,216,236 B2 | * | 5/2007 | Kou | H04L 63/0442 713/159 |
| 8,209,222 B2 | * | 6/2012 | Esclamada | G06Q 10/107 705/14.4 |
| 8,448,719 B2 | * | 5/2013 | Furukawa | H04L 9/0841 173/150 |
| 8,700,894 B2 | * | 4/2014 | Hammell | H04L 63/0464 380/277 |
| 8,745,390 B1 | * | 6/2014 | Atwood | H04L 63/061 713/169 |
| 8,966,267 B1 | * | 2/2015 | Pahl | H04L 9/0844 713/171 |

(Continued)

*Primary Examiner* — David Garcia Cervetti

(57) ABSTRACT

Attributes of a session, between a source device and a verification device, for sending first verification data, such as a password and an account identifier, are determined. The verification device generates user device data based on an identifier, such as a mobile device number (MDN), for a user device associated with the account identifier. An identifier, such as an MDN, associated with the source device and an encryption key associated with the verification device are determined based on session attributes. Second verification data is generated based on the identifier associated with the source device. The second verification data is encrypted using the encryption key and forwarded to the verification device. The verification device decrypts the second verification data and compares the identifier for the user device to the identifier for the source device to determine whether the first verification data was sent from the user device.

20 Claims, 9 Drawing Sheets

(56) References Cited

U.S. PATENT DOCUMENTS

| | | | | |
|---|---|---|---|---|
| 8,996,873 B1* | 3/2015 | Pahl | | H04L 63/061 713/173 |
| 9,026,784 B2* | 5/2015 | Buruganahalli | | H04L 67/146 713/151 |
| 9,253,171 B2* | 2/2016 | Neumann | | H04L 63/062 |
| 9,262,642 B1* | 2/2016 | Roth | | G06F 21/62 |
| 9,426,185 B1* | 8/2016 | Vora | | H04L 65/1069 |
| 2002/0046286 A1* | 4/2002 | Caldwell | | H04L 29/06 709/229 |
| 2002/0172190 A1* | 11/2002 | Vatanen | | H04W 12/10 370/352 |
| 2003/0051146 A1* | 3/2003 | Ebina | | H04L 63/0428 713/185 |
| 2003/0212615 A1* | 11/2003 | Whitehead, Jr. | | G06Q 10/0833 705/30 |
| 2004/0111378 A1* | 6/2004 | Howell | | G06Q 20/04 705/75 |
| 2005/0125684 A1* | 6/2005 | Schmidt | | H04L 9/30 726/27 |
| 2005/0149730 A1* | 7/2005 | Aissi | | G06F 21/31 713/168 |
| 2005/0160269 A1* | 7/2005 | Akimoto | | H04L 63/0272 713/171 |
| 2005/0193211 A1* | 9/2005 | Kurose | | G06F 21/31 713/185 |
| 2006/0144927 A1* | 7/2006 | Love | | G06Q 10/063 235/380 |
| 2006/0174110 A1* | 8/2006 | Strom | | G06F 21/10 713/165 |
| 2006/0182124 A1* | 8/2006 | Cole | | H04L 63/0428 370/395.54 |
| 2006/0274899 A1* | 12/2006 | Zhu | | H04L 9/083 380/281 |
| 2006/0276998 A1* | 12/2006 | Gupta | | G06F 11/263 702/182 |
| 2007/0067833 A1* | 3/2007 | Colnot | | H04L 9/3271 726/9 |
| 2007/0180227 A1* | 8/2007 | Akimoto | | H04L 63/0464 713/153 |
| 2007/0198834 A1* | 8/2007 | Ksontini | | H04L 63/0853 455/411 |
| 2008/0212771 A1* | 9/2008 | Hauser | | G06F 21/305 380/44 |
| 2008/0248763 A1* | 10/2008 | Park | | H04W 4/10 455/90.2 |
| 2008/0287101 A1* | 11/2008 | An | | H04W 8/26 455/411 |
| 2008/0301436 A1* | 12/2008 | Yao | | H04L 9/321 713/155 |
| 2008/0320302 A1* | 12/2008 | Pilant | | H04L 63/10 713/161 |
| 2009/0007198 A1* | 1/2009 | Lavender | | H04N 7/163 725/91 |
| 2009/0109477 A1* | 4/2009 | Oomura | | G06F 3/1222 358/1.15 |
| 2009/0113203 A1* | 4/2009 | Tsuge | | H04L 29/12377 713/151 |
| 2009/0249448 A1* | 10/2009 | Choi | | H04L 63/0815 726/4 |
| 2009/0249489 A1* | 10/2009 | Livshits | | G06F 21/54 726/26 |
| 2009/0271633 A1* | 10/2009 | Cohen | | G06F 21/34 713/185 |
| 2009/0288143 A1* | 11/2009 | Stebila | | G06F 21/445 726/3 |
| 2009/0292927 A1* | 11/2009 | Wenzel | | G06F 21/41 713/185 |
| 2010/0070768 A1* | 3/2010 | Furukawa | | H04L 9/0841 713/171 |
| 2010/0088517 A1* | 4/2010 | Piersol | | H04L 9/3236 713/171 |
| 2010/0142499 A1* | 6/2010 | Zhang | | H04L 63/08 370/338 |
| 2010/0150347 A1* | 6/2010 | Teruyama | | H04L 9/0894 380/255 |
| 2010/0183150 A1* | 7/2010 | Lee | | H04L 9/0822 380/255 |
| 2010/0268783 A1* | 10/2010 | Mizosoe | | G06Q 10/107 709/206 |
| 2010/0306542 A1* | 12/2010 | Funk | | H04L 9/0822 713/171 |
| 2010/0325435 A1* | 12/2010 | Park | | H04L 9/0844 713/171 |
| 2010/0332398 A1* | 12/2010 | Aage | | G06F 21/42 705/64 |
| 2011/0026715 A1* | 2/2011 | Rossi | | H04L 9/083 380/278 |
| 2011/0065426 A1* | 3/2011 | Bae | | H04W 4/14 455/415 |
| 2011/0145891 A1* | 6/2011 | Bade | | H04L 63/101 726/4 |
| 2011/0154443 A1* | 6/2011 | Thakur | | G06F 21/41 726/3 |
| 2011/0194698 A1* | 8/2011 | Asano | | H04L 9/0643 380/282 |
| 2011/0231319 A1* | 9/2011 | Bayod | | G06Q 20/10 705/71 |
| 2012/0110324 A1* | 5/2012 | Geng | | H04L 63/061 713/155 |
| 2012/0159167 A1* | 6/2012 | Lee | | H04L 9/321 713/168 |
| 2012/0166801 A1* | 6/2012 | Park | | H04L 9/3228 713/169 |
| 2012/0204032 A1* | 8/2012 | Wilkins | | H04L 9/006 713/170 |
| 2012/0275597 A1* | 11/2012 | Knox | | H04L 9/0833 380/210 |
| 2013/0024688 A1* | 1/2013 | Wen | | H04L 63/0807 713/168 |
| 2013/0054960 A1* | 2/2013 | Grab | | G06F 21/10 713/155 |
| 2013/0067016 A1* | 3/2013 | Adkins | | H04L 9/0866 709/208 |
| 2013/0086652 A1* | 4/2013 | Kavantzas | | G06F 21/335 726/5 |
| 2013/0159195 A1* | 6/2013 | Kirillin | | G06Q 20/322 705/71 |
| 2013/0305039 A1* | 11/2013 | Gauda | | G06F 21/6218 713/153 |
| 2014/0122888 A1* | 5/2014 | Yoon | | H04L 9/0844 713/171 |
| 2014/0143155 A1* | 5/2014 | Karlov | | G04G 99/006 705/71 |
| 2014/0259134 A1* | 9/2014 | Scavo | | H04L 67/141 726/7 |
| 2014/0277837 A1* | 9/2014 | Hatton | | B60R 25/24 701/2 |
| 2014/0344326 A1* | 11/2014 | Kamath | | H04L 67/1008 709/203 |
| 2014/0351588 A1* | 11/2014 | Hedtke | | G06Q 30/018 713/168 |
| 2014/0351593 A1* | 11/2014 | Anson | | H04L 63/0428 713/168 |
| 2014/0358777 A1* | 12/2014 | Gueh | | G06Q 20/3223 705/43 |
| 2015/0019442 A1* | 1/2015 | Hird | | G06Q 20/3829 705/71 |
| 2015/0039890 A1* | 2/2015 | Khosravi | | H04L 9/0841 713/171 |
| 2015/0052352 A1* | 2/2015 | Dolev | | H04W 12/06 713/156 |
| 2015/0067328 A1* | 3/2015 | Yin | | H04L 9/3236 713/168 |
| 2015/0089568 A1* | 3/2015 | Sprague | | H04L 63/0876 726/1 |
| 2015/0188704 A1* | 7/2015 | Takenaka | | H04L 9/0869 713/171 |

(56) References Cited

U.S. PATENT DOCUMENTS

| | | | | |
|---|---|---|---|---|
| 2015/0208326 A1* | 7/2015 | Vrbaski | ................ | H04W 48/16 370/338 |
| 2015/0208335 A1* | 7/2015 | Vrbaski | ................ | H04W 48/18 455/426.1 |
| 2015/0271177 A1* | 9/2015 | Mun | ................ | H04L 63/0876 726/7 |
| 2015/0288514 A1* | 10/2015 | Pahl | ................ | H04L 9/085 713/171 |
| 2015/0381621 A1* | 12/2015 | Innes | ................ | G06F 21/31 726/7 |
| 2016/0014100 A1* | 1/2016 | Matsuo | ................ | H04L 63/0435 713/169 |
| 2016/0014213 A1* | 1/2016 | Ajitomi | ................ | H04L 67/02 709/228 |
| 2016/0065370 A1* | 3/2016 | Le Saint | ................ | H04L 9/0841 713/155 |
| 2016/0072775 A1* | 3/2016 | Choi | ................ | H04L 63/0428 713/171 |
| 2016/0072807 A1* | 3/2016 | Park | ................ | G06F 21/10 713/171 |
| 2016/0087797 A1* | 3/2016 | Barbir | ................ | H04L 9/3226 713/171 |
| 2016/0088430 A1* | 3/2016 | Connor | ................ | H04L 67/24 455/456.1 |
| 2016/0094543 A1* | 3/2016 | Innes | ................ | H04L 63/0823 726/6 |
| 2016/0110711 A1* | 4/2016 | Collinge | ................ | G06Q 20/3829 705/71 |
| 2016/0140334 A1* | 5/2016 | Forehand | ................ | G06F 21/44 726/19 |
| 2016/0171238 A1* | 6/2016 | Sibillo | ................ | G06F 21/6227 713/164 |
| 2016/0191507 A1* | 6/2016 | Bao | ................ | H04L 63/0853 455/411 |
| 2016/0192163 A1* | 6/2016 | Miner | ................ | H04W 4/90 455/404.1 |
| 2016/0234022 A1* | 8/2016 | Motika | ................ | H04L 9/3213 |
| 2016/0241389 A1* | 8/2016 | Le Saint | ................ | H04L 9/0844 |
| 2016/0275300 A1* | 9/2016 | Ko | ................ | G06F 21/602 |
| 2016/0315772 A1* | 10/2016 | McCallum | ................ | H04L 9/0844 |
| 2016/0330179 A1* | 11/2016 | Choi | ................ | H04L 63/061 |
| 2016/0344724 A1* | 11/2016 | Shoshan | ................ | H04L 63/0428 |
| 2016/0352524 A1* | 12/2016 | Kinney | ................ | H04L 9/3247 |
| 2016/0352705 A1* | 12/2016 | Lockhart | ................ | H04L 63/061 |
| 2016/0357951 A1* | 12/2016 | Fasoli | ................ | G06F 21/305 |
| 2016/0366127 A1* | 12/2016 | Tanoni | ................ | H04L 63/0853 |
| 2017/0006006 A1* | 1/2017 | Rawcliffe | ................ | H04L 63/08 |
| 2017/0006132 A1* | 1/2017 | Sorenson, III | ................ | H04L 67/32 |
| 2017/0070497 A1* | 3/2017 | McCallum | ................ | H04L 9/3226 |
| 2017/0244608 A1* | 8/2017 | Reaux-Savonte | ................ | H04L 41/5054 |
| 2018/0247049 A1* | 8/2018 | Fang | ................ | H04L 9/32 |

* cited by examiner

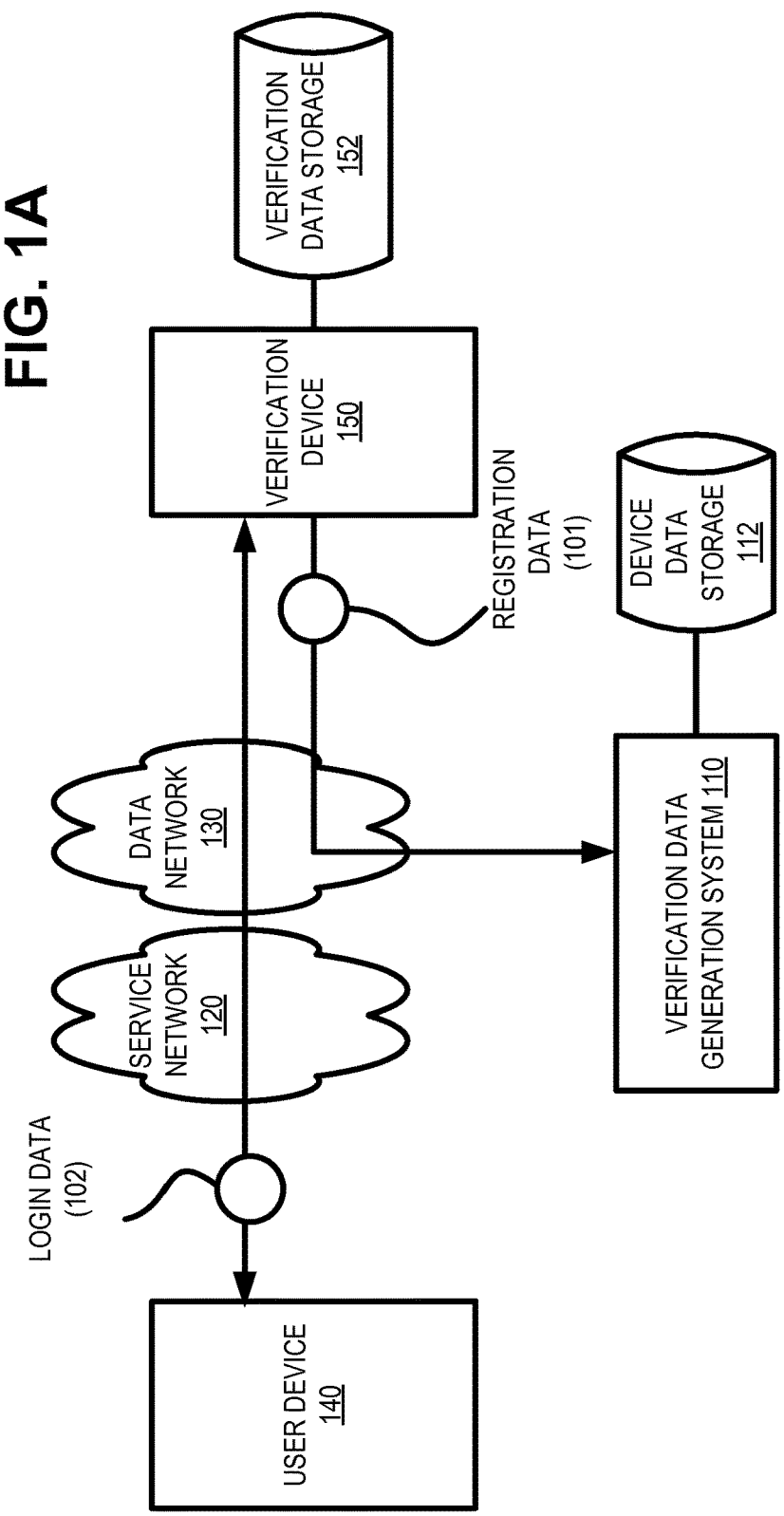

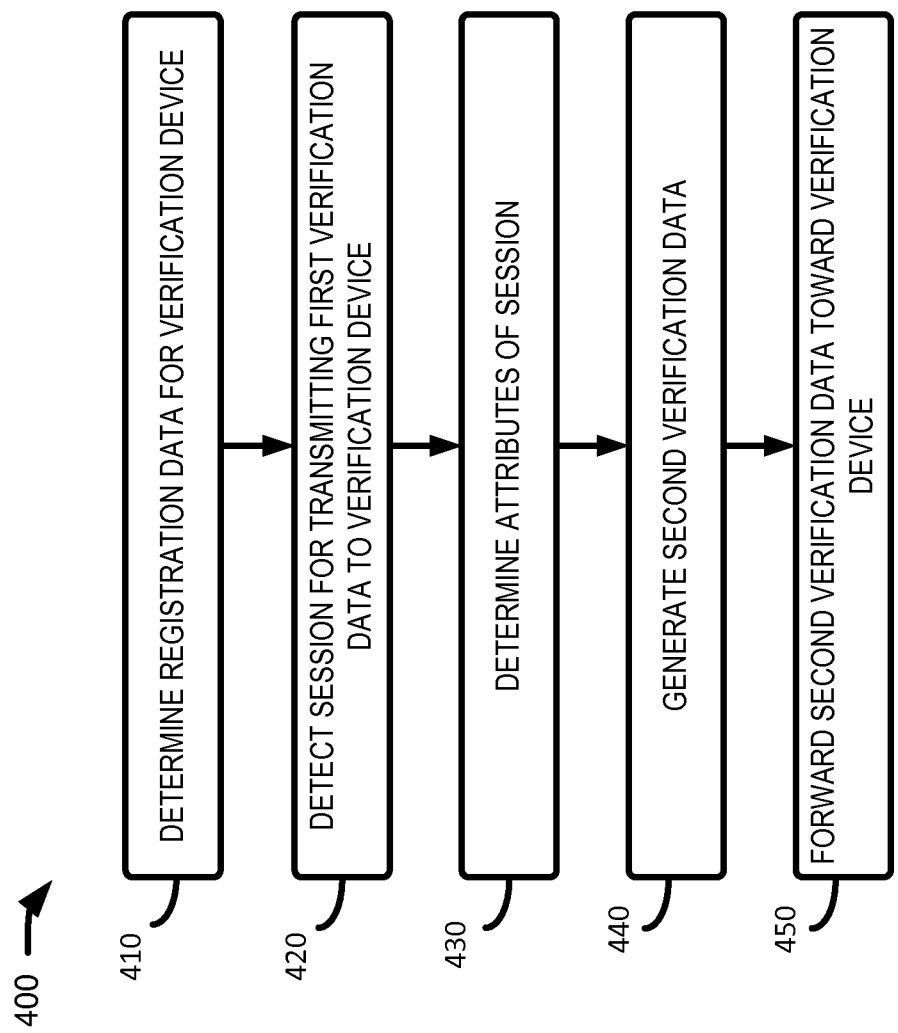

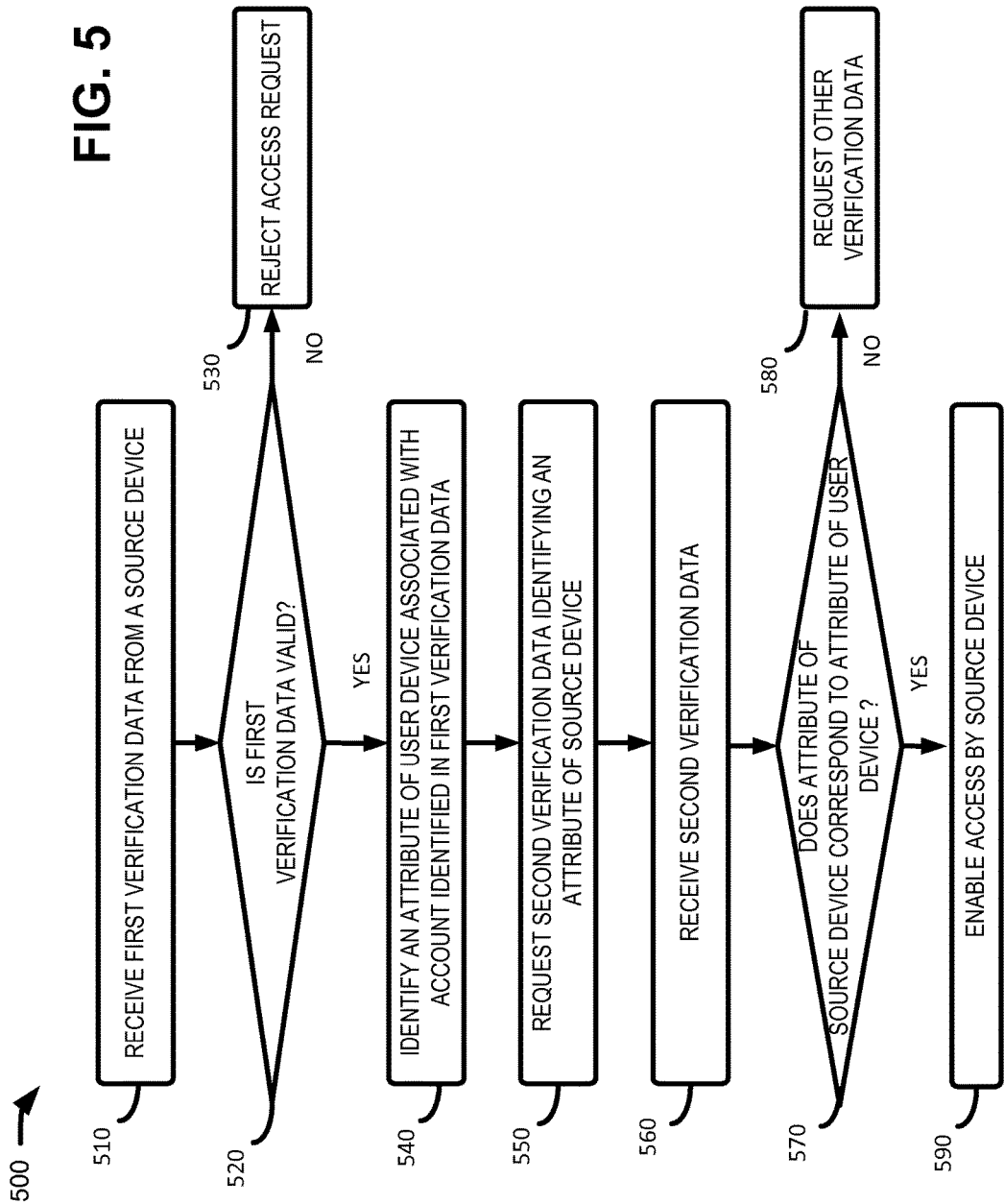

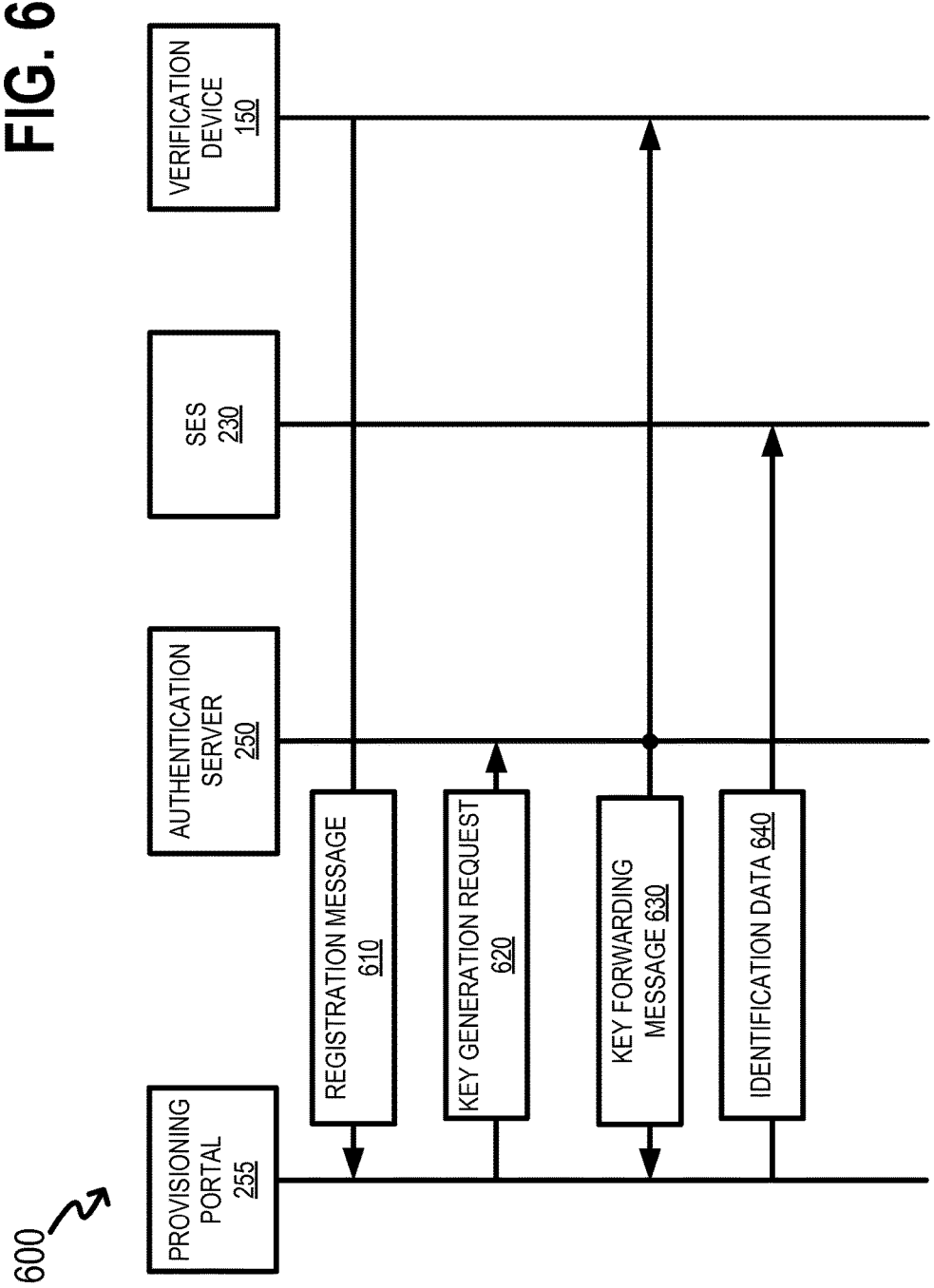

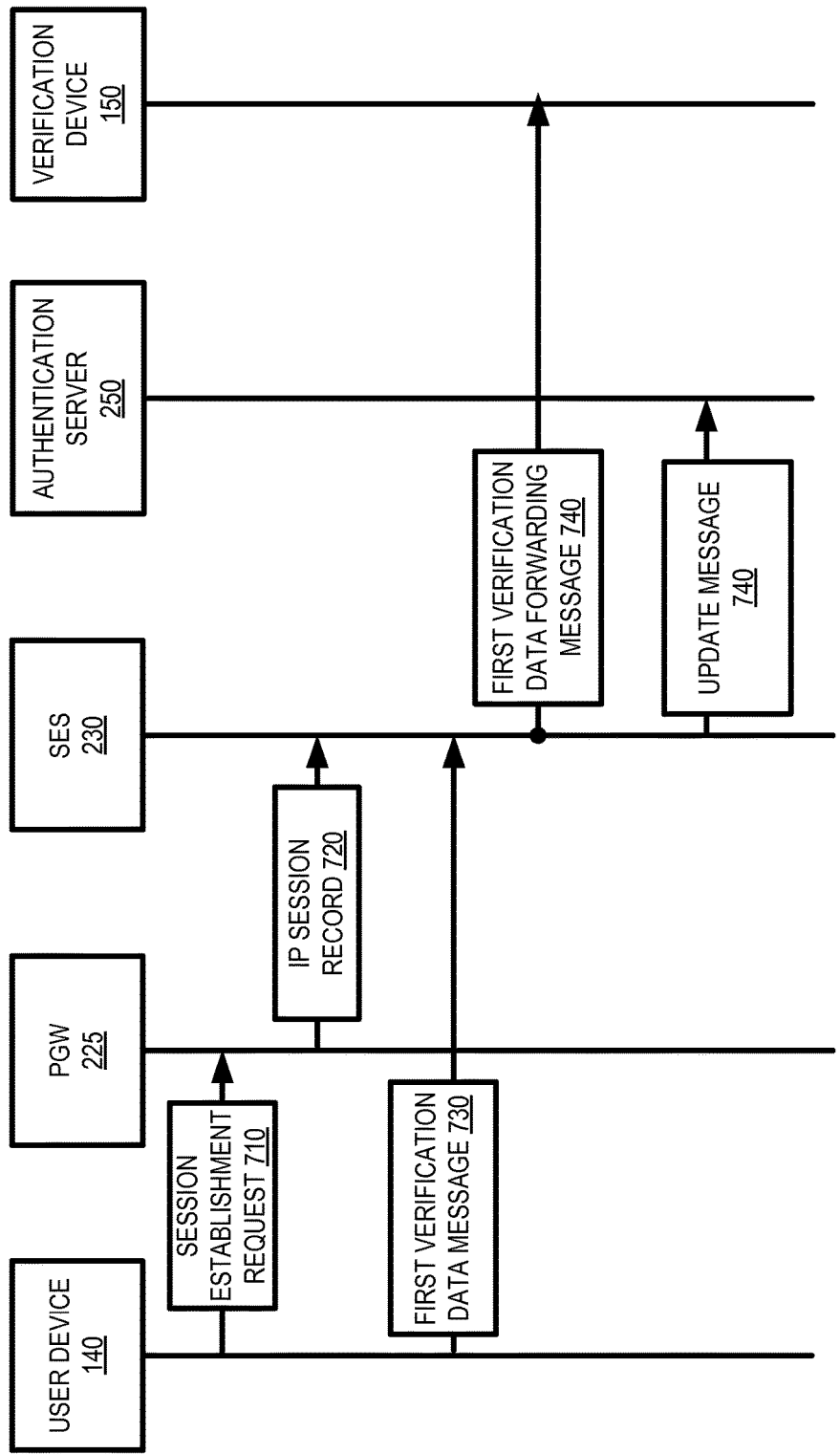

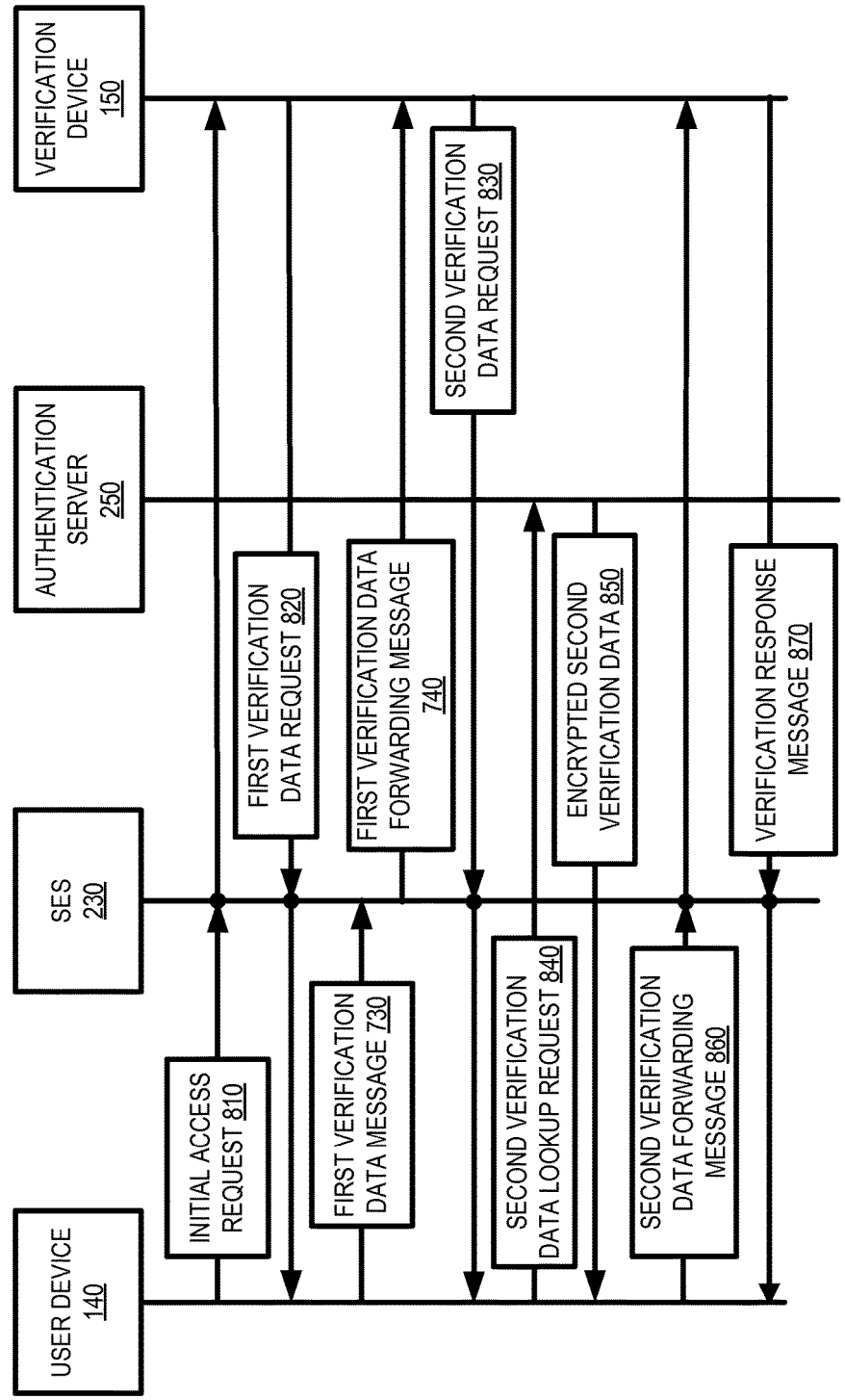

USING A MOBILE DEVICE NUMBER (MDN) SERVICE IN MULTIFACTOR AUTHENTICATION

BACKGROUND

To access certain data or services, a user may be asked to provide appropriate credentials, such as an account identifier and a correct corresponding password. To prevent unauthorized access using the credentials (e.g., if the credentials are obtained by an unauthorized third-party), the user may be asked to provide additional data and or perform one or more actions (e.g., provide multifactor authentication). For example, the user may be asked to provide certain data associated with the user (e.g., a name of a family member, a residence address, a telephone number, additional account details, etc.) to verify that the credentials are being presented by the correct user. In another example, data may be sent via a short messaging service (SMS), e-mail, or other message to a device associated with the user, and the user may be asked to provide the data in connection with the credentials to verify that the credentials are being sent from the device associated with the user.

BRIEF DESCRIPTION OF THE DRAWINGS

FIGS. 1A and 1B illustrate an overview of an exemplary implementation described herein;

FIG. 4 is a flow diagram illustrating an exemplary process for generating second verification data in the environment shown in FIG. 2;

FIG. 5 is a flow diagram illustrating an exemplary process for performing multifactor verification in the environment shown in FIG. 2;

FIG. 6 shows an exemplary communication exchange for registering a verification device in the environment shown in FIG. 2;

FIG. 7 depicts an exemplary communication exchange for determining session data in the environment shown in FIG. 2; and FIG. 8 depicts an exemplary communication exchange for performing multifactor authentication in the environment shown in FIG. 2.

DETAILED DESCRIPTION OF PREFERRED EMBODIMENTS

Figure 1B:
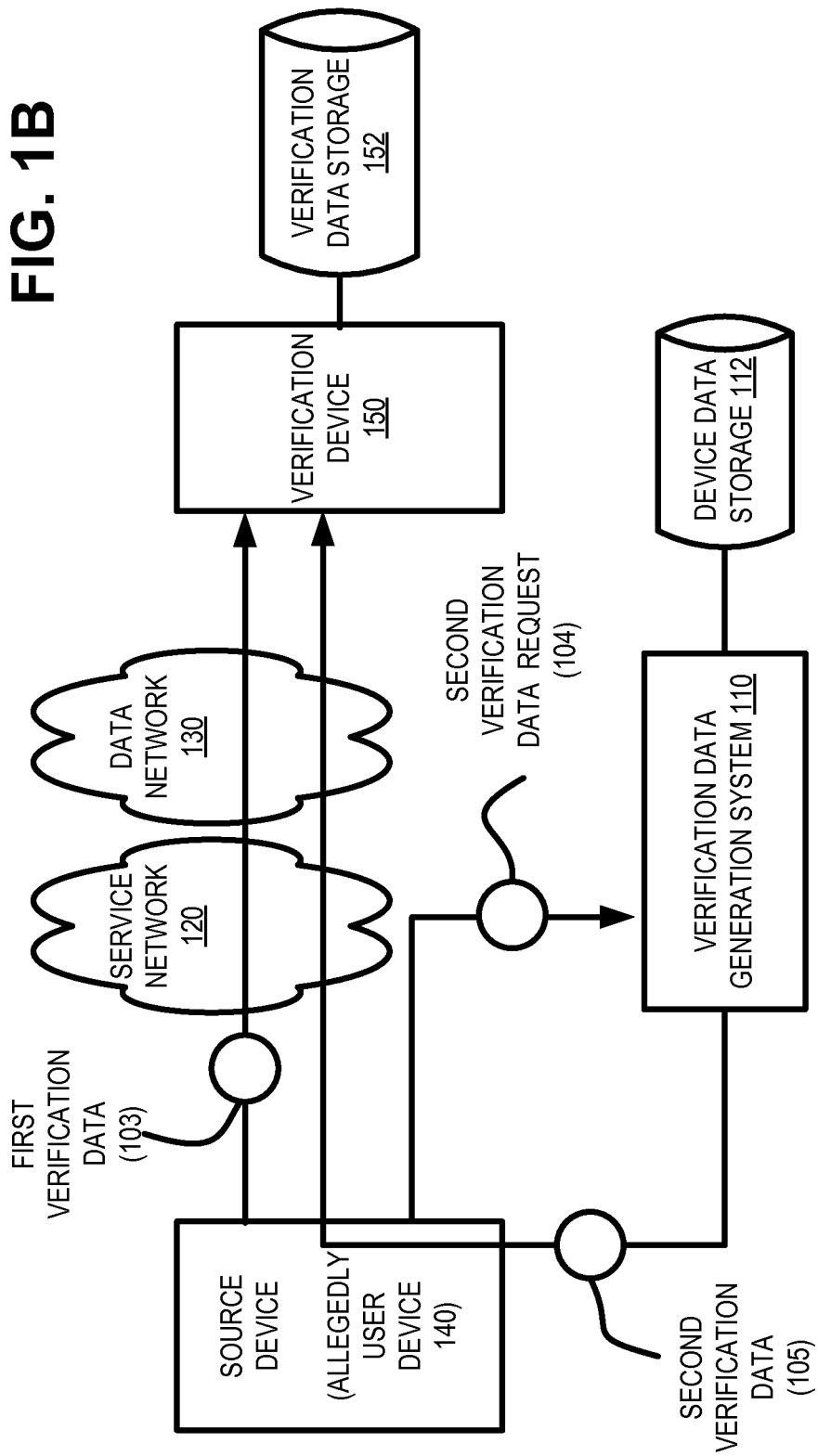

The following detailed description refers to the accompanying drawings. The same reference numbers in different drawings may identify the same or similar elements. Also, the following detailed description does not limit the invention.

Implementations discussed herein relate to automatically generating and forwarding verification data related to a user device. For example, the verification data may be generated based on a mobile device number (MDN) or other data identifying the user device. The verification data may be used to perform multifactor verification with respect to credentials (e.g., account data and a password) sent from the user device. For example, attributes associated with a session forwarding the credentials (e.g., data identifying a source device in the session) may be compared to the forwarded verification data to confirm that the credentials are actually sent from the user device associated with the credentials.

As used herein, the term "user" is intended to be broadly interpreted to include a user device or a person using the user device. Also, the terms "user," "consumer," "subscriber," and/or "customer" may be used interchangeably.

FIGS. 1A and B illustrate an overview of an exemplary implementation described herein. As shown in FIG. 1A, a verification data generation system 110 may communicate via a service network 120, such as a wireless wide area network (WWAN)), with a user device 140 (e.g., smart phone, computer, etc.). Verification data generation system 110 may also communicate via a data network, such as the Internet, with a verification device 150. As described in greater detail below, verification device 150 may correspond to an application server for verifying that user device 140 is eligible to access a service and/or data.

As shown in FIG. 1A, verification data generation system 110 may receive registration data 101 from verification device 150. For example, verification data generation system 110 may provide a registration portal to receive registration data 101 from verification device 150 via data network 130. Registration data 101 may include, for example, a network address (e.g., an internet protocol (IP) address), a port, and/or an identifier associated with verification device 150. Registration data 101 may further include a public encryption key that may be used to securely encrypt data intended for verification device 150, and verification device 150 may use a private encryption key to recover the encrypted data. Verification data generation system 110 may store registration data 101 and/or other data related to user device 140 and/or verification device 150 in device data storage 112. For example, device data storage 112 may store information regarding sessions established between user device 140 and verification device 150 via service network 120.

As further shown in FIG. 1A, user device 140 may exchange login data 102 with verification device 150. For example, when user device 140 successfully registers to access a restricted service or data, user device 140 and verification device 150 may exchange, as login data 102, credentials that may be used by user device 140 to access the service or the data. For example, login data 102 may identify an account and a password associated with user device 140.

Additionally, login data 102 may include data identifying one or more attributes of user device 140. For example, login data 102 may include a mobile device number (MDN), a mobile subscriber identification number (MSIN), an international mobile subscriber identity (IMSI), a temporary mobile subscriber identity (TMSI), a media access control address (MAC address), internet protocol (IP) address, or other data that may be presented by user device 140 when accessing service network 120. In other examples, login data 102 may include an international mobile station equipment identity (IMEI) for mobile devices, a mobile equipment identifier (MEID), a universally unique identifier (UUID) for non-mobile devices such as devices that communicate using short range communications protocols, such as Wi-Fi or Bluetooth®. Verification device 150 may store login data 102 in verification data storage 152. For example, verification data storage 152 may store data identifying an MDN or other device identifier and password associated with an account.

As shown in FIG. 1B, a source device (which may correspond to user device 140) may attempt to access a service or data by forwarding first verification data 103 to verification device 150. First verification data 103 may identify credentials (e.g., an account identifier and an associated password) associated with user device 140. Verification device 150 may determine whether first verification data 103 includes valid credentials (e.g., identifies a valid account and a password associated with that account).

If verification device 150 determines that first verification data 103 includes valid credentials, verification device 150 may direct the source device to forward additional verification data. For example, the source device may forward a second verification data request 104 to verification data generation system 110. Based on receiving second verification data request 104, verification data generation system 110 may determine one or more attributes of the source device and/or a session between the source device and verification device 150. For example, verification data generation system 110 may identify a source IP address, a source port, a destination IP address, and a destination port used to transmit first verification data 103. Verification data generation system 110 may use the contents of second verification data request 104 and the data in device data storage 112 to identify the source device and verification device 150 associated with the session. For example, verification data generation system 110 may identify the source device based on the source IP address and/or the source port for the session, and verification data generation system 110 may identify verification device 150 based on the destination IP address and/or the destination port for the session.

Verification data generation system 110 may generate second verification data 105 that includes information identifying the source device and may encrypt second verification data 105 using the encryption key associated with verification device 150. For example, verification data generation system 110 may determine an MDN or other identifier associated with the source device, and may encrypt the identifier (or a value, such as a hash, calculated based on the identifier) using the encryption key associated with verification device 150. Verification data generation system 110 may then forward the encrypted second verification data 105 to verification device 150, such as via the session between source device and verification device 150. Because second verification data 105 is encrypted using an encryption key for verification device 150, second verification data 105, although possibly sent via the source, cannot be accessed and/or modified by the source device.

Verification device 150 may decrypt second verification data 105 and may compare the resulting device identifier (e.g., the MDN value for the source device) with a stored identifier associated with the account identifier (e.g., an MDN for user device 140). In other words, verification device 150 may use second verification data 105 to determine whether first verification data 103 is received from user device 140. If second verification data 105 and the stored identifier include corresponding values (e.g., the same hash value), verification device 150 may determine that first verification data 103 was sent from user device 140.

If second verification data 105 and the stored identifier do not include corresponding values (e.g., the same hash value), verification device 150 may determine that first verification data 103 was not sent from user device 140. Verification device 150 may request additional verification data, such as personal data for a user associated with the account (e.g., a name of a family member, a residence address, a telephone number, additional account details, etc.) and/or forwarding of an alphanumeric string sent to the source device via a short messaging service (SMS), e-mail, or other message.

Figure 2:
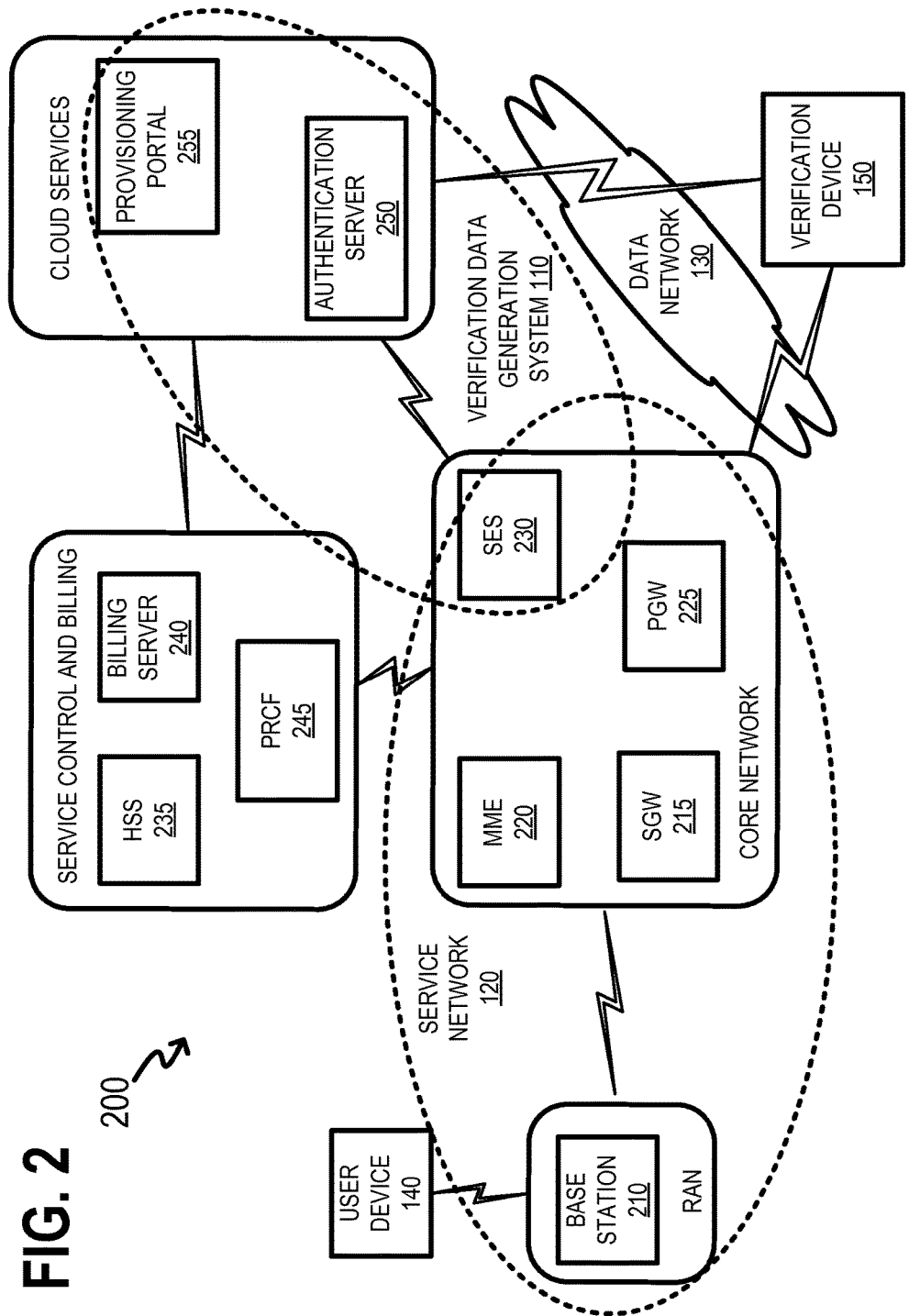
FIG. 2 shows exemplary environment in which systems and/or methods described herein may be implemented.

FIG. 2 illustrates an exemplary environment 200 in which systems and/or methods, described herein, may be implemented. As shown in FIG. 2, environment 200 may include data network 130, user device 140, verification device 150, a base station 210, a serving gateway (SGW) 215, a mobility management entity device (MME) 220, a packet data network (PDN) gateway (PGW) 225, a service enforcement server (SES) 230, a home subscriber server (HSS) 235, a billing server 240, a policy/rule change function (PRCF) 245, an authentication server 250, and a provisioning portal 255.

Environment 200 may include a radio access network (RAN) that is associated with a long-term evolution (LTE) network and/or another type of wireless communications network, and a core network, such as an evolved packet core (EPC) that operates based on a third generation partnership project (3GPP) wireless communication standard. The RAN may include one or more base stations, such as evolved Node Bs (eNBs), via which user device 140 communicates with the core network. As shown in FIG. 2, the core network may include SGW 215, MME 220, PGW 225 and/or 230 and may control access by user device 140 to data network 130 and/or to cloud services associated with authentication server 250 and/or provisioning portal 255. In environment 200, a service control and billing portion may include HSS 235, billing server 240, and/or PRCF 245. The service control and billing portion may process telephone calls on behalf of user device 140. The service control and billing portion may firjter manage authentication, connection initiation, account information, user profile information, etc. associated with access by user device 140 and/or verification device 150 to cloud services associated with authentication server 250 and/or provisioning portal 255.

User device 140 may include a communication device, such as a wireless mobile device that is capable of communicating with base station 210 and/or a network (e.g., service network 120 and/or data network 130). For example, user device 140 may include a cellular telephone, a personal communications system (PCS) terminal (e.g., a device that combines a cellular radiotelephone with data processing and data communications capabilities), a personal digital assistant (PDA), a smart phone, a laptop computer, a tablet computer, a camera, a personal gaming system, or another type of computation or communication device. In other implementations, user device 140 may include a set-top box (STB), a tablet, a gaming machine, a computer, a fitness tracker, a smart watch, smart glasses, or another peripheral and/or wearable device that may be used in connection with another user device.

Base station 210 may include one or more network devices that receive, process, and/or transmit traffic, such as audio, video, text, and/or other data, destined for and/or received from user device 140. In an example implementation, base station 210 may be an eNB device and may be part of the LTE network. Base station 210 may receive traffic from and/or send traffic to data network 130 via SGW 215 and PGW 225. Base station 210 may send traffic to and/or receive traffic from user device 140 via an wireless interface. Base station 210 may be associated with a RAN.

SGW 215 may include one or more network devices, such as a gateway, a router, a modem, a switch, a firewall, a network interface card (NIC), a hub, a bridge, a proxy server, an optical add-drop multiplexer (OADM), or another type of device that processes and/or transfers traffic. SGW 215 may, for example, aggregate traffic received from one or more base stations 210 and may send the aggregated traffic to data network 130 via PGW 225. In one example implementation, SGW 215 may route and forward user data packets, may act as a mobility anchor for a user plane during inter-eNB handovers, and may act as an anchor for mobility between LTE and other 3GPP technologies.

MME 220 may include one or more network devices that perform operations associated with a handoff to and/or from service network 120. MME 220 may perform operations to register user device 140 with the service network to handoff user device 140 from service network 120 to another network, to handoff a user device 140 from the other network to the service network 120 and/or to perform other operations. MME 220 may perform policing operations for traffic destined for and/or received from user device 140. MME 220 may authenticate user device 140 (e.g., via interaction with HSS 235) to establish the session between user device 140 and verification device 150.

PGW 225 may include one or more network devices, such as a gateway, a router, a modem, a switch, a firewall, a NIC, a hub, a bridge, a proxy server, an optical add/drop multiplexor (OADM), or another type of device that processes and/or transfers traffic. PGW 225 may, for example, provide connectivity of user device 140 to data network 130 by serving as a traffic exit/entry point for user device 140. PGW 225 may perform policy enforcement, packet filtering, charging support, lawful intercept, and/or packet screening. PGW 225 may also act as an anchor for mobility between 3GPP and non-3GPP technologies.

SES 230 may identify user profiles as provided by HSS and/or PRCF 245 to PGW 225 and may forward information regarding these user profiles to authentication server 250. For example, SES 230 may identify IP session records associated with transmission of first verification data or other communications between user device 140 and verification device 150. As described in greater detail below, SES 230 may identify, based on session records associated with user device 140, an MDN or other associated identifier. SES 230 may form a hash or calculate another value based on the MDN, may encrypt the resulting value based on a key provided by authentication server 250, and may forward, as second verification data 106, the encrypted MDN-based value to verification device 150 via PGW 225.

HSS 235 may include one or more server devices. In some implementations, HSS 235 may gather, process, search, store, and/or provide information in a manner described herein. For example, HSS 235 may manage, update, and/or store, in a memory associated with HSS 235, profile information associated with a generated identifier that identifies services and/or data that may be accessed by user device 140.

Additionally or alternatively, HSS 235 may perform authentication, authorization, and/or accounting operations associated with a communication connection with user device 140. In some implementations, HSS 235 may maintain billing information and may assess charges and credits to an account associated with user device 140 based on network usage information received from the core network and/or from the cloud services. Additionally, or alternatively, HSS 235 may store information regarding temporary credentials that are assigned to user device 140 (e.g., as used to transmit first verification data 103).

Billing server 240 may store data identifying changes in services (e.g., based on receiving registration data 101 from verification device 150) and may modify user and device profiles, as applied by HSS 235 and/or PRCF based on the service changes. Billing server 240 may further determine and collect fees associated the requested service changes.

PRCF 245 may include one or more devices that provide policy control decisions and flow based charging control functionalities. PRCF 245 may provide network control regarding service data flow detection, gating, quality of service (QoS) and flow based charging, etc. PRCF 245 may determine how a certain service data flow shall be treated, and may ensure that user plane traffic mapping and treatment are in accordance with a user's subscription profile. For example, PRCF 245 may identify and apply a user profile related to user device 140 when transmitting first verification data 103.

Authentication server 250 may receive and store information regarding verification device 150 (e.g., registration data 101). For example, authentication server 250 may store data identifying public keys used to encrypt data intended for different verification devices 150. When user device 140 is transmitting second verification data 105, authentication server 250 may identify one of the public encryption keys to be used based on a destination address, an application identifier (APP-ID) associated with verification device 150, etc. Authentication server 250 may then forward data identifying the selected encryption key to SES for encryption of an identifier (e.g., an MDN or a hash of the MDN) associated with user device 140.

Provisioning portal 255 may include a device for receiving registration data 101 from verification device 150 and for updating authentication server 250 to store data identifying verification device 150, an associated address, an encryption key, etc.

Data network 130 may include one or more wired and/or wireless networks. For example, data network 130 may include the Internet, a public land mobile network (PLMN), and/or another network. Additionally, or alternatively, data network 130 may include a local area network (LAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

The number of devices and/or networks, illustrated in FIG. 2, is provided for explanatory purposes only. In practice, environment 200 may include additional devices and/or networks, fewer devices and/or networks, different devices and/or networks, or differently arranged devices and/or networks than those illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
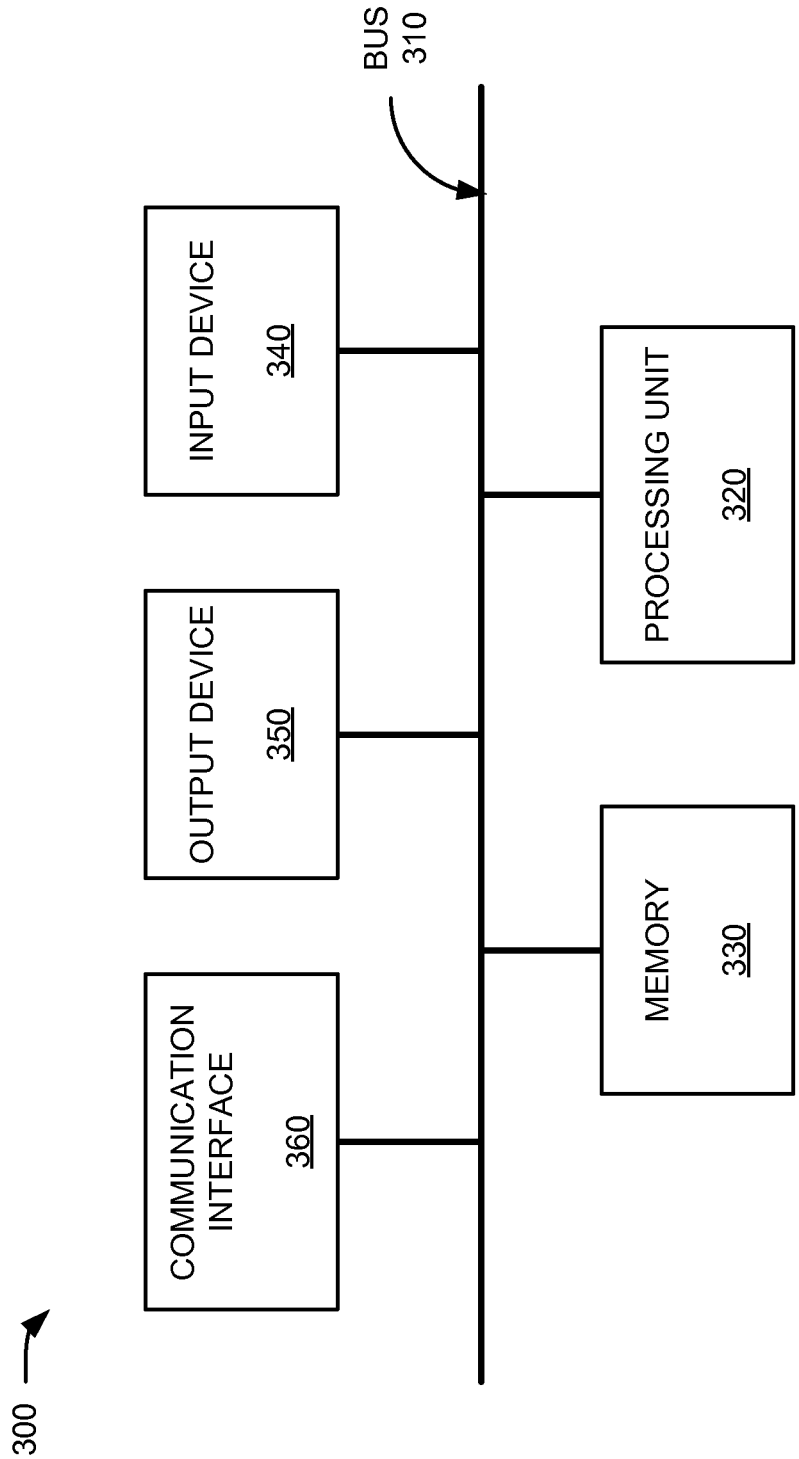
FIG. 3 shows a diagram of exemplary components that may be included in a computing device included in the environment shown in FIG. 2.

FIG. 3 is a diagram illustrating exemplary components of a computing device 300. User device 140, base station 210, SGW 215, MME 220, PGW 225, SES 230, HSS 235, billing server 240, PRCF 245, authentication server 250, and/or provisioning portal 255 may include one or more devices 300 and/or one or more components of computing device 300. As shown in FIG. 3, computing device 300 may include a bus 310, a processor 320, a memory 330, an input component 340, an output component 350, and a communication interface 360.

Bus 310 may include a path that permits communication among the components of computing device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to computing device 300, such as a keyboard, a keypad, a button, a switch, etc. Output component 350 may include a mechanism that outputs information to the user, such as a display, a speaker, one or more light emitting diodes (LEDs), etc. Communication interface 360 may include a transceiver mechanism that enables computing device 300 to communicate with other devices and/or systems via wireless communications, wired communications, or a combination of wireless and wired communications. For example, communication interface 360 may include mechanisms for communicating with another device or system via a network. Alternatively or additionally, communication interface 360 may be a logical component that includes input and output ports, input and output systems, and/or other input and output components that facilitate the transmission of data to other devices. In one implementation, user device 140 may include an antenna to exchange signals with base station 210.

Computing device 300 may perform certain operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

FIG. 3 shows exemplary components of computing device 300. In other implementations, computing device 300 may contain fewer components, additional components, different components, or differently arranged components than those depicted in FIG. 3. For example, computing device 300 may include one or more switch fabrics instead of, or in addition to, bus 310. In another example, in some implementations, a display may not be included in computing device 300, and in these situations, computing device 300 may be a "headless" device that does not include input component 340. Additionally or alternatively, one or more operations described as being performed by a particular component of computing device 300 may be performed by one or more other components, in addition to or instead of the particular component of computing device 300.

FIG. 4 is a flow diagram illustrating an exemplary process 400 for generating second verification data 105 that can reliably identify a sending device (e.g., user device 140) without requiring a user input. In one implementation, process 400 may be performed by verification data generation system 110 (e.g., one or more of SES 230, authentication server 250, and/or provisioning portal 255). In other implementations, process 400 may be performed by one or more other devices of environment 200, such as PGW 225, PRCF 245, or HSS 235.

As shown in FIG. 4, process 400 may include determining registration data 101 for verification device 150 (block 410). For example, as described above with respect to FIG. 1A, verification device 150 may forward registration data 101 to verification data generation system 110. For instance, provisioning portal 255 may provide a input mechanism (e.g., a graphical user interface (GUI) that enables an operator associated with verification device 150 to forward registration data 101. Registration data 101 may include, for example, an encryption key associated with verification device 150. Registration data 101 may further include information associated with verification device 150, such as the APP-ID, an IP address and a port for receiving second verification data 105, etc.

As shown in FIG. 4, process 400 may further include detecting a session for transmitting first verification data 103 from user device 140 to verification device 150 (block 420) and determining attributes of the session (block 430). For example, a session may be established between user device 140 and verification device 150 to exchange first verification data 103, and verification device 150 may forward, during the session, a request 104 for second verification data. The request 104 for second verification data may include, for example, the APP-ID, data identifying a source IP address and/or a source port associated with user device 140 and/or data identifying a destination IP address and/or a destination port associated with verification device 150. In block 430, verification data generation system 110 may use the contents of the request 104 for second verification data to determine additional attributes associated with user device 140 and/or verification device 150. For example, verification data generation system 110 may identify an MDN associated with user device 140 based on the source IP address and/or a source port. Additionally, verification data generation system 110 may identify an encryption key associated with verification device 150 based on, for example, the APP-ID, destination IP address and/or a destination port.

As shown in FIG. 4, process 400 may include generating second verification data 105 (block 440) and forwarding second verification data 105 toward verification device 150 (block 450). For example, verification data generation system 110 may form, as second verification data 105, a hash of the MDN and/or other identifier for a source device transmitting first verification data 103. Verification data generation system 110 may further encrypt second verification data 105 using the encryption key associated with verification device 150. Because user device 140 (or other source device) does not have a decryption key associated with verification device 150, user device 140 cannot access or modify second verification data 105. Verification data generation system 110 may forward encrypted second verification data 105 during the session between user device 140 and verification device 150. For example, verification data generation system 110 may forward encrypted second verification data 105 to user device 140, and user device 140 may forward encrypted second verification data 105 to verification device 150 during the session.

FIG. 5 is a flow diagram illustrating an exemplary process 500 for performing multifactor authentication in environment 200. In one implementation, process 500 may be performed by verification device 150. In another implementation, process 500 may be performed by one or more other devices of environment 200, such as user device 140, PGW 225, SES 230, HSS 235, PRCF 245, or authentication server 250.

As shown in FIG. 5, process 500 may include receiving first verification data 103 from a source device (block 510) and determining whether first verification data 103 is valid (block 520). For example, as shown in FIG. 1B, verification device 150 may receive first verification data 103 during a session established with the source device (allegedly user device 140). Verification device 150 may determine, e.g., based on data stored in verification data storage 152, whether first verification data 103 includes valid credentials, such as correct account identifier and an associated password. If first verification data 103 is not valid (block 520—NO), verification device 150 may reject the access request associated with first verification data 103 (block 530). For example, verification device 150 may forward a message indicating that access is denied and prompting the source device to forward different, valid credentials.

If first verification data 103 is valid (block 520—YES), verification device 150 may identify an attribute of user device 140 associated with the account identified in first verification data 103 (block 550). For example, verification device 150 may identify an MDN and/or a hash of the MDN associated with user device 140. Verification device 150 may further request second verification data 105 identifying an attribute of the source device (block 550). For example, verification device 150 may forward a request to the source device requesting second verification data 105, and the source device may forward the request to verification data generation system 110. As previously described with respect to process 400, second verification data 105 may determine a MDN associated with the source device, form a hash of the MDN, and encrypt the hash based on an encryption key associated with verification device 150. Verification device 150 may receive second verification data 105 (block 560). For example, verification device 150 may receive, as second verification data 105, the encrypted hash of the MDN of the source device.

Verification device 150 may determine whether the attribute of the source device corresponds to the attribute of user device 140 (block 570). For example, verification device 150 may decrypt second verification data 105 to recover the encrypted hash of the MDN of the source device, and verification device 150 may determine whether the hash of the MDN of the sending device corresponds to the hash of the MDN of user device 140. If the attribute of the source device does not correspond to the attribute of user device 140 (block 570—NO), verification device 150 may request other verification data from the source device (block 580). For example, verification device 150 may direct the source device to forward biographical information associated with the account holder. Additionally or alternatively, verification device 150 may forward a message (e.g., an SMS or e-mail message) carrying an alphanumeric code to the source device and may direct the source device to reply with the alphanumeric code. Otherwise, if the attribute of the source device does corresponds to the attribute of user device 140 (block 570—YES), verification device 150 may enable access by the source device (block 590). For example, verification device 150 may forward data (e.g., access credentials) and/or code that enables the source device to access a service or data.

FIG. 6 shows an exemplary communications exchange 600 for registering verification device 150 to receive second verification data 105 in environment 200. As shown in FIG. 6, communications exchange 600 may include messages exchanged between provisioning portal 255, authentication server 250, SES 230, and/or verification device 150.

For example, verification device 150 may forward a registration message 610. In registration message 610, verification device 150 may sign up for an account, login, and subscribe to an authentication service related to receiving second verification data 105. Verification device 150 may specify, in registration message 610, a destination (e.g., an IP address and a port of verification device 150) for receiving a reply from provisioning portal 255 and data from other components in environment 200 (e.g., second verification data 105). Registration message 610 may also include, for example, a public key for verification device 150 (VD-PUK)

In response to receiving registration message 610, provisioning portal 255 may create an identifier for an application associated with verification device 150 (e.g., the APP-ID) and may forward a key generation request 620 to authentication server 250. Key generation request 620 may request generation of a public key (AS-PUK) and a private key (AS-PRK) by authentication server 250 (e.g., AS-PKC) with respect to the APP-ID, VD-PUK, IP address, and port for verification device 150. Key generation request 620 may include, for example, data associated with the APP-ID, contents included in registration message 610, and the IP address and the port of verification device 150. Based on receiving key generation request 620, authentication server 250 may generate and store the public key (AS-PUK) and the private key (AS-PRK) pair. Authentication server 250 may generate key forwarding message 630 forwarding the public key (AS-PUK) to provisioning portal 255 and to verification device 150. As described in greater detail below, verification device 150 may use the public key (AS-PUK) to access first verification data 103 when received from user device 140.

As shown in FIG. 6, provisioning portal 255 may also forward identification data 640 for verification device 150 to SES 230. Identification data 640 may include the identifier (e.g., the APP-ID), the IP address, and the port for verification device 150, and SES 230 may store identification data 640.

FIG. 6 shows exemplary messages in communications exchange 600 according to some implementations. In other implementations, communications exchange 600 may contain fewer messages, additional messages, different messages, or differently arranged messages than those depicted in FIG. 6. Additionally or alternatively, communications exchange 600 may include one or more messages described as being exchanged by a particular component of environment 200 being exchanged by one or more other components of environment 200.

FIG. 7 shows an exemplary communications exchange 700 for collecting session data related to a session between user device 140 and verification device 150 in environment 200. As shown in FIG. 7, communications exchange 700 may include messages exchanged between user device 140, PGW 225, SES 230, authentication server 250, and/or verification device 150.

As shown in FIG. 7, communications exchange 700 may include user device 140 forwarding a session establishment request 710 to establish a session for forwarding first verification data 103 (e.g., the credentials associated with user device 140). PGW 225 may forward an IP session record 720 to SES 230, and IP session record 720 may identify data included in session establishment request 710. For example, IP session record 720 may identify an MDN and an IP address associated with user device 140, and SES 230 may store this data.

After a session is established (e.g., by PGW 225 based on session establishment request 710), user device 140 may forward a first verification data message 730 to SES 230. First verification data message 730 may include, for example, first verification data 103 (e.g., the credentials associated with user device 140). First verification data message 730 may further identify, for example, a source IP address, a destination IP, and a destination port associated with the session.

Based on receiving first verification data message 730, SES 230 may identify the MDN for user device 140 based on the source IP address and may further determine that the destination IP and the destination port associated with first verification data message 730 correspond to the IP address and the port for verification device 150. As shown in FIG. 7, SES 230 may send a first verification data forwarding message 740 to verification device 150. First verification data forwarding message 740 may include the contents of first verification data message 730 (e.g., first verification data 103).

If more than a threshold amount of time since user device 140 has forwarded a prior first verification data message 730 (e.g., user device 140 previously attempted to access services via verification device 150), SES 230 may send an update message 750 to authentication server 250. Update message 750 may include, for example, data identifying the MDN for user device 140, the source IP address for user device 140, a source port for user device 140 used to forward first verification data message 730, the destination IP address for verification device 150, the port for verification device 150, the APP-ID, etc. Authentication server 250 may update data for user device 140 and/or verification device 150 based on receiving update message 750.

FIG. 7 shows exemplary messages in communications exchange 700 according to one implementation. In other implementations, communications exchange 700 may contain fewer messages, additional messages, different messages, or differently arranged messages than those depicted in FIG. 7. Additionally or alternatively, communications exchange 700 may include one or more messages described as being exchanged by a particular component of environment 200 being exchanged by one or more other components of environment 200.

FIG. 8 shows an exemplary communications exchange 800 for performing multifactor authentication in environment 200 based on exchanging first verification data 103 and second verification data 105. As shown in FIG. 8, communications exchange 800 may include messages exchanged between user device 140, SES 230, authentication server 250, and/or verification device 150.

As shown in FIG. 8, communications exchange 800 may include user device 140 forwarding an initial access request 810 to verification device 150 via SES 230. Initial access request 810 may include a request to access a service and/or data via verification device 150. Based on receiving initial access request 810, verification device 150 may forward a first verification data request 820 to user device 140, and first verification data request 820 may request an identifier and a password (e.g., first verification data 103). Based on receiving first verification data request 820, user device 140 may forward first verification data 103 to verification device 150. For example, as described above with respect to communications exchange 700 in FIG. 7, user device 140 may forward the requested first verification data 103 to verification device 150 via first verification data forwarding message 740.

Verification device 150 may determine whether first verification data 103 received from user device 140 includes valid credentials. For example, verification device 150 may determine whether the account identifier is valid and whether a hash of the password correctly corresponds to a stored hash associated with the account identifier. If verification device 150 determines that first verification data 103 includes valid credentials, verification device 150 may generate a random security identifier (SID), determine an MDN associated with the account identifier (MDN-A), and forward a second verification data request 830 to user device 140. Second verification data request 830 may request second verification data 105. For example, second verification data request 830 may request a MDN token associated with user device 140. For example, second verification data request 830 may name the APP-ID and the SID encoded based on the public key for authentication server 250 (AS-PUK) (e.g., as forwarded in key forwarding message 630).

As shown in FIG. 8, user device 140 may, based on receiving second verification data request 830, forward a second verification data lookup request 840 to authentication server 250. Second verification data lookup request 840 may direct authentication server 250 to lookup the MDN and/or other data associated with user device 140 (e.g., a source IP address, a source port, a destination IP address, and a destination port associated with the session between user device 140 and verification device 150). When authentication server 250 identifies the MDN and/or the other data associated with user device 140, authentication server 250 may use this information to determine, the public key for verification device 150 (VD-PUK) and the private key for authentication server 250 (AS-PRK). Authentication server 250 may use the private key for authentication server 250 (AS-PRK) to decode the SID; generate a keyed-hash message authentication code (HMAC) for APP-ID, SID, MDN, and data associated with the session (e.g., source IP address and source port used to transmit first verification data 103); and may encrypt the HMAC using the public key for verification device 150 (VD-PUK). For example, authentication server 250 may determine the HMAC based on equation 1:

$$HMAC(K,m)=H((K\oplus opad)\|H(K\oplus ipad)\|m)) \quad (1).$$

In equation 1, H is a cryptographic hash function, K is a secret key padded to the right with extra zeroes to the input block size of the hash function, or the hash of the original key if it is longer than that block size, m is the message to be authenticated, ∥ denotes concatenation, ⊕ denotes exclusive or (XOR), opad is the outer padding, and ipad is the inner padding.

As shown in FIG. 8, authentication server 250 may forward the encrypted second verification data 850 to user device 140. Encrypted second verification data 850 may include, for example, the HMAC that is encrypted using the public key for verification device 150 (VD-PUK). Based on receiving encrypted second verification data 850, user device 140 may forward, to verification device 150, second verification data forwarding message 860. Second verification data forwarding message 860 may include second verification data 105, such as the HMAC that is encrypted using the public key for verification device 150 (VD-PUK).

Based on receiving second verification data forwarding message 860, verification device 150 may determine whether second verification data 105 is accurate with respect to user device 140 and the session for forwarding first verification data 103. For example, verification device 150 may decrypt the HMAC value based on the private key for verification device 150 (VD-PRK). Verification device 150 may further generate an HMAC with respect to a device associated with the first verification data based on, for example, the APP-ID, the SID, the MDN-A (e.g., the telephone number associated with the account), and other session data (e.g., the source IP address, the source port, the destination IP address, and the destination). Verification device 150 may then compare the decrypted HMAC for user device 140 (e.g., from second verification data 105) with the generate HMAC associated with the account credentials. If the two HMACs match, verification device 150 may conclude that user device 140 corresponds to a device associated with first verification data 103. Conversely, if the two HMACs do not match, verification device 150 may conclude that user device 140 is not associated with first verification data 103. Verification device 150 may forward a verification response message 870 based on comparing the HMACs. For example, if the two HMACs do not match, verification response message 870 may request additional verification from user device 140 (e.g., providing personal data, supplying an alpha-numerical forwarded to user device 140 via SMS, etc.). If the two HMACs do match, verification response message 870 may indicate that user device 140 is authorized to access a restricted service and/or restricted data.

Various preferred embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIGS. 4 and 5, the order of the blocks in processes 400 and 500 may be modified in other implementations. Furthermore, non-dependent blocks may be performed in parallel. Furthermore, processes 400 and 500 may include additional and/or fewer blocks than shown in FIGS. 4 and 5.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

What is claimed is:

1. A method comprising:
   identifying, by a processor of a verification data generation system, an encryption key associated with a verification device, wherein the verification device is different from the verification data generation system;
   determining, by the processor, attributes of a session between a source device and the verification device, wherein the source device is different from the verification data generation system, wherein first verification data is sent from the source device to the verification device via the session, wherein the first verification data identifies an account, wherein the account is associated with a user device, wherein the verification device generates user device data associated with a first identifier of the user device, and wherein the verification device sends the source device a request for additional verification data;
   receiving, by the processor and from the source device, the request for additional verification data;
   determining, by the processor and in response to receiving the request for additional verification data, a second identifier associated with the source device based on information in the request for additional verification data and information regarding sessions established between the source device and the verification device stored in a storage associated with the verification data generation system;
   generating, by the processor, second verification data based on the second identifier associated with the source device;
   encrypting, by the processor and based on the encryption key associated with the verification device, the second verification data; and
   forwarding, by the processor, the encrypted second verification data toward the verification device, wherein the verification device decrypts the encrypted second verification data to recover the second verification data, wherein the verification device compares the second verification data to the user device data associated with the first identifier of the user device, and wherein the verification device determines that the source device corresponds to the user device when the user device data corresponds to the second verification data.

2. The method of claim 1, wherein the first identifier corresponds to a first mobile device number (MDN) associated with the user device and the second identifier corresponds to a second MDN associated with the source device.

3. The method of claim 1, wherein the user device data includes a first hash of the first identifier, and wherein generating the second verification data includes:
   forming a second hash of the second identifier.

4. The method of claim 3, wherein the verification device forms the first hash by determining a first hash message authentication code (HMAC) based on the first identifier, attributes of the user device, and attributes of the verification device, and
   wherein forming the second hash includes generating a second HMAC based on the second identifier and the attributes of the session.

5. The method of claim 1, wherein the first verification data further identifies a password, wherein the verification device determines whether the password is associated with the account, and wherein the second verification data is generated based on the verification device determining that the password is associated with the account.

6. The method of claim 1, wherein identifying the encryption key associated with the verification device includes:
   providing a provisioning portal to receive registration data from a plurality of verification devices, wherein the registration data identifies internet protocol (IP) addresses and encryption keys associated with the plurality of verification devices, and wherein determining the attributes of the session includes:
   identifying a destination IP address of a device that received the first verification data via the session; and
   selecting, as the encryption key associated with the verification device, one of the encryption keys associated with an IP address, of the IP addresses, that corresponds to the destination IP address.

7. The method of claim 1, wherein the verification device requests third verification data from the source device when the verification device determines that the source device does not correspond to the user device, wherein the third verification data include a user input from the source device, and wherein the verification device determines whether the user input corresponds to data associated with the account.

8. A device comprising:
a memory to store one or more instructions; and
a processor configured to execute the one or more instructions to:
identify an encryption key associated with a verification device, wherein the verification device determines whether a source device is eligible to access a service or data, wherein the verification device is different from the device;
determine attributes of a session between the source device and the verification device, wherein the source device is different from the device, wherein first verification data is sent from the source device to the verification device via the session, wherein the first verification data identifies an account, wherein the account is associated with a user device, wherein the verification device generates user device data associated with a first identifier of the user device, and wherein the verification device sends the source device a request for additional verification data;
receive, from the source device, the request for additional verification data;
determine, in response to receiving the request for the additional verification data and based on information in the request for additional verification data and information regarding sessions established between the source device and the verification device stored in a storage associated with the device, a second identifier associated with the source device;
generate second verification data based on the second identifier associated with the source device;
encrypt, based on the encryption key associated with the verification device, the second verification data; and
forward the encrypted second verification data toward the verification device, wherein the verification device decrypts the encrypted second verification data to recover the second verification data, wherein the verification device compares the second verification data to the user device data associated with the first identifier of the user device, and wherein the verification device determines that the source device corresponds to the user device when the user device data corresponds to the second verification data.

9. The device of claim 8, wherein the first identifier corresponds to a first mobile device number (MDN) associated with the user device and the second identifier corresponds to a second MDN associated with the source device.

10. The device of claim 8, wherein the user device data includes a first hash of the first identifier, and wherein the processor, when executing the one or more instructions to generate the second verification data, is further configured to:
form a second hash of the second identifier.

11. The device of claim 10, wherein the verification device forms the first hash by determining a first hash message authentication code (HMAC) based on the first identifier, attributes of the user device, and attributes of the verification device, and
wherein the processor, when executing the one or more instructions to form the second hash, is further configured to:
generate a second HMAC based on the second identifier and the attributes of the session.

12. The device of claim 8, wherein the first verification data further identifies a password, wherein the verification device determines whether the password is associated with the account, and wherein the second verification data is generated based on the verification device determining that the password is associated with the account.

13. The device of claim 8, wherein the processor, when executing the one or more instructions to identify the encryption key associated with the verification device, is further configured to:
provide a provisioning portal to receive registration data from a plurality of verification devices, wherein the registration data identifies internet protocol (IP) addresses and encryption keys associated with the plurality of verification devices, and
wherein the processor, when executing the one or more instructions to determine the attributes of the session, is further configured to:
identify a destination IP address of a second device that received the first verification data via the session; and
select, as the encryption key associated with the verification device, one of the encryption keys associated with an IP addresses, of the IP addresses, that corresponds to the destination IP address.

14. The device of claim 8, wherein the verification device requests third verification data from the source device when the verification device determines that the source device does not correspond to the user device, wherein the third verification data includes a user input from the source device, and wherein the verification device determines whether the user input corresponds to data associated with the account.

15. A non-transitory computer-readable medium to store instructions, the instructions comprising:
one or more instructions that when executed by a processor associated with a verification data generation system, cause the processor to:
identify an encryption key associated with a verification device, wherein the verification device determines whether a source device is eligible to access a service or data, and wherein verification data generation system is different from the verification device and the source device;
determine attributes of a session between the source device and the verification device, wherein first verification data is sent from the source device to the verification device via the session, wherein the first verification data identifies an account, wherein the account is associated with a user device, wherein the verification device generates user device data associated with a first identifier of the user device, and wherein the verification device sends the source device a request for additional verification data;
receive, from the source device, the request for additional verification data;
determine, in response to receiving the request for the additional verification data and based on information in the request for additional verification data and information regarding sessions established between the source device and the verification device stored in a storage associated with the verification data generation system, a second identifier associated with the source device;

generate second verification data based on the second identifier associated with the source device;

encrypt, based on the encryption key associated with the verification device, the second verification data; and forward the encrypted second verification data toward the verification device, wherein the verification device decrypts the encrypted second verification data to recover the second verification data, wherein the verification device compares the second verification data to the user device data associated with the first identifier of the user device, and wherein the verification device determines that the source device corresponds to the user device when the user device data corresponds to the second verification data.

16. The non-transitory computer-readable medium of claim 15, wherein the first identifier corresponds to a first mobile device number (MDN) associated with the user device and the second identifier corresponds to a second MDN associated with the source device.

17. The non-transitory computer-readable medium of claim 15, wherein the user device data includes a first hash of the first identifier, and wherein the one or more instructions cause the processor, when generating the second verification data, to be further configured to:

form a second hash of the second identifier.

18. The non-transitory computer-readable medium of claim 17, wherein the verification device forms the first hash by determining a first hash message authentication code (HMAC) based on the first identifier, attributes of the user device, and attributes of the verification device, and wherein the one or more instructions cause the processor, when forming the second hash, to be further configured to:

generate a second HMAC based on the second identifier and the attributes of the session.

19. The non-transitory computer-readable medium of claim 15, wherein the first verification data further identifies a password, wherein the verification device determines whether the password is associated with the account, and wherein the second verification data is generated based on the verification device determining that the password is associated with the account.

20. The non-transitory computer-readable medium of claim 15, wherein the one or more instructions cause the processor, when identifying the encryption key associated with the verification device, to be further configured to:

provide a provisioning portal to receive registration data from a plurality of verification devices, wherein the registration data identifies internet protocol (IP) addresses and encryption keys associated with the plurality of verification devices, and wherein the one or more instructions cause the processor, when determining the attributes of the session, to be further configured to:

identify a destination IP address of a device that received the first verification data via the session; and select, as the encryption key associated with the verification device, one of the encryption keys associated with an IP address, of the IP addresses, that corresponds to the destination IP address.

* * * * *